United States Patent
Kanbe et al.

[11] Patent Number: 6,106,914
[45] Date of Patent: Aug. 22, 2000

[54] LAMINAR STRUCTURE AND A HOSE FORMED OF THE LAMINAR STRUCTURE EXHIBITING GOOD ADHESIVENESS BETWEEN ADJACENT LAYERS

[75] Inventors: Shinobu Kanbe, Komaki; Hidehito Osada, Kasugai, both of Japan

[73] Assignee: Tokai Rubber Industries, Ltd., Komaki-Shi, Japan

[21] Appl. No.: 09/010,948

[22] Filed: Jan. 22, 1998

[30] Foreign Application Priority Data

Jan. 22, 1997 [JP] Japan ................................. 9-009560

[51] Int. Cl.$^7$ .............................. B32B 7/10; B32B 1/08; B32B 27/06; B32B 27/38; F16L 11/04
[52] U.S. Cl. ................ 428/36.91; 428/413; 428/421; 428/422; 138/137; 138/141
[58] Field of Search ................ 428/36.9, 36.92, 428/421, 423.1, 422, 694 BF, 413, 36.91; 138/137, 141

[56] References Cited

U.S. PATENT DOCUMENTS

| | | | |
|---|---|---|---|
| 5,519,079 | 5/1996 | Tomoshige | 524/436 |
| 5,798,158 | 8/1998 | Koike et al. | 428/36.9 |
| 5,958,532 | 9/1999 | Krause et al. | 428/36.3 |

FOREIGN PATENT DOCUMENTS

7-157566   6/1995   Japan .

*Primary Examiner*—Ellis Robinson
*Assistant Examiner*—John J. Figueroa
*Attorney, Agent, or Firm*—Wall Marjama Bilinski & Burr

[57] ABSTRACT

A laminar structure consisting of at least a first layer (2) formed of a fluoro rubber or a fluoro resin, and a second layer (4) laminated in contact with the first layer and formed of an epichlorohydrin rubber, wherein the improvement comprises; the second layer (4) being formed of a rubber composition which contains 100 parts by weight of an epichlorohydrin rubber material as a base rubber component, 0.1–5 parts by weight of a vulcanizing agent formed of a 2,3-dimercaptoquinoxaline derivative represented by the formula (1), 0.1–5 parts by weight of a salt of 1,8-diazabicyclo(5,4,0)undecene-7 represented by the formula (2), and 1–20 parts by weight of at least one hydrotalcite compound represented by the formula (3), wherein $R_1$, $R_2$, $R_3$ and $R_4$ represent a same one or respective different ones of a hydrogen atom and an alkyl group having 1–4 carbon atoms, $X^-$ represents an acid radical of carboxylic acid or phenolic resin, $M_1^{2+}$ represents at least one divalent metal selected from the group consisting of Mg, Ca, Sr and Ba, $M_2^{2+}$ represents at least one divalent metal selected from the group consisting of Zn, Cd, Pb and Sn, $M^{3+}$ represents a trivalent metal, $A^{n-}$ represents an n-valent anion, a and b respectively represent a real number from 0 to 10, x represents a+b and a real number from 1 to 4, y represents an integer from 1 to 5, and w represents a real number.

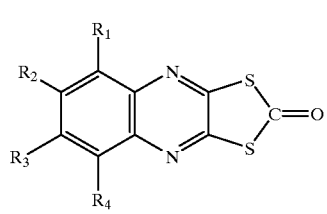

(1)

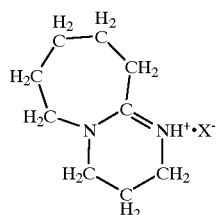

(2)

$[(M_1^{2+})_a(M_2^{2+})_b]_x(M^{3+})_y(OH)_{2x+3y-2}(A^{n-})_{y/n} \cdot wH_2O$   (3)

28 Claims, 1 Drawing Sheet

FIG. 1

FIG. 2 under the number 6,106,914

LAMINAR STRUCTURE AND A HOSE FORMED OF THE LAMINAR STRUCTURE EXHIBITING GOOD ADHESIVENESS BETWEEN ADJACENT LAYERS

This application is based on Japanese Patent Application No. 9-9560 filed Jan. 22, 1997, the content of which is incorporated hereinto by reference.

BACKGROUND OF THE INVENTION

1. Field of the Invention

The present invention relates in general to a laminar structure and a hose formed of the laminar structure. More particularly, the invention is concerned with such a laminar structure which exhibits excellent adhesiveness or adhesive strength between a first layer formed of a fluoro rubber or a fluoro resin and a second layer formed of an epichlorohydrin rubber. In particular, the invention relates to a hose, above all, a fuel hose, having such a laminar structure.

2. Discussion of the Related Art

A laminar structure having a plurality of layers which are laminated on one another is conventionally used for various applications. For instance, there is known a laminar structure consisting at least of a first layer formed of a fluoro rubber or a fluoro resin, and a second layer which is laminated in contact with the first layer and which is formed of an epichlorohydrin rubber. Such a laminar structure is used as a hose by utilizing the characteristics of the materials which provide the individual layers of the laminar structure. In particular, the laminar structure is used as a fuel hose wherein the first layer serves as an innermost layer of the hose, by taking advantage of excellent fuel impermeability of the fluoro rubber or fluoro resin which provides the first layer.

For providing the laminar structure as described above, it is required to bond the first layer of the fluoro rubber or fluoro resin and the second layer of the epichlorohydrin rubber to each other. However, it is known that the fluoro rubber or fluoro resin has low adhesiveness with respect to other materials. In view of this, there have been made various research to provide an improved bonding technique which assures sufficient bonding between the fluoro rubber or the fluoro resin and the epichlorohydrin rubber. However, the conventionally proposed bonding techniques put a great emphasis on the improvement of the bonding between the first layer of the fluoro rubber or fluoro resin and the second layer of the epichlorohydrin rubber, so that the epichlorohydrin rubber suffers from compression set and reduced resistance to sour gasoline, and the storage stability of unvulcanized rubber is deteriorated.

When the fluoro rubber or fluoro resin and the epichlorohydrin rubber are bonded by vulcanization, the vulcanization system of the epichlorohydrin rubber generally includes ethylenethiourea as a vulcanizing agent and a lead compound such as minium as an acid receptive agent. In addition, calcium hydroxide, a salt of 1,8-diazabicyclo(5,4,0)undecene-7 and/or onium salt are added to the vulcanization system, to thereby improve the adhesive strength between the fluoro rubber or fluoro resin and the epichlorohydrin rubber. However, in view of the recently increasing worldwide demand for safety, it is desirable to regulate disposal and use of the lead compound. Accordingly, there is an urgent demand for development of an alternative vulcanization system which does not use the lead compound.

As a result of an extensive study by the inventors of the present invention so as to find the alternative vulcanization system which does not use the lead compound, it has been found that a specific vulcanization system significantly improves the adhesive strength between the fluoro rubber or fluoro resin and the epichlorohydrin rubber, permits the epichlorohydrin rubber to exhibit excellent characteristics in terms of compression set, and assures excellent sour gasoline resistance.

SUMMARY OF THE INVENTION

It is therefore an object of the present invention to provide a laminar structure which assures improved adhesive strength between the fluoro rubber or fluoro resin and the epichlorohydrin rubber without using a lead compound in a vulcanization system of the epichlorohydrin rubber. It is an optional object of the invention to provide a hose having such a laminar structure, in particular, a fuel hose suitable for a fuel transporting line.

The above object may be achieved according to a first aspect of the present invention which provides a laminar structure consisting of at least a first layer formed of a fluoro rubber or a fluoro resin, and a second layer which is laminated in contact with the first layer and which is formed of an epichlorohydrin rubber, wherein the improvement comprises: the second layer being formed of a rubber composition which contains 100 parts by weight of an epichlorohydrin rubber material as a base rubber component, 0.1–5 parts by weight of a vulcanizing agent formed of a 2,3-dimercaptoquinoxaline derivative represented by the following formula (1);

(1)

wherein $R_1$, $R_2$, $R_3$ and $R_4$ represent a same one or respective different ones of a hydrogen atom and an alkyl group having 1–4 carbon atoms, 0.1–5 parts by weight of a salt of 1,8-diazabicyclo(5,4,0)undecene-7 represented by the following formula (2);

(2)

wherein X⁻ represents an acid radical of carboxylic acid or phenolic resin, and 1–20 parts by weight of at least one hydrotalcite compound represented by the following formula (3);

(3)

wherein $M_1^{2+}$ represents at least one divalent metal selected from the group consisting of Mg, Ca, Sr and Ba, $M_2^{2+}$ represents at least one divalent metal selected from the group consisting of Zn, Cd, Pb and Sn, $M^{3+}$ represents a trivalent metal, $A^{n-}$ represents an n-valent anion, a and b respectively represent a real number from 0 to 10, x represents a+b and a real number from 1 to 10, y represents an integer from 1 to 5, and w represents a real number.

According to the above first aspect of the present invention, the 2,3-dimercaptoquinoxaline derivative, the salt of 1,8-diazabicyclo(5,4,0)undecene-7, and the at least one hydrotalcite compound are used in combination as a new vulcanization system of the epichlorohydrin rubber material. This arrangement eliminates the conventionally used lead compound such as minium, and significantly improves the adhesive strength between the fluoro rubber or fluoro resin and the epichlorohydrin rubber, to thereby provide an improved laminar structure wherein the first and second layers are effectively laminated on each other. Further, the second layer formed of the epichlorohydrin rubber which is obtained by using the present vulcanization system exhibits excellent characteristics in terms of compression set, tension set, and sour gasoline resistance.

The above optional object may be attained according to a second aspect of the present invention which provides a hose having a laminar structure consisting of at least a first layer formed of a fluoro rubber or a fluoro resin, and a second layer which is laminated in contact with the first layer and which is formed of an epichlorohydrin rubber, wherein the improvement comprises: the second layer being formed of a rubber composition which contains 100 parts by weight of an epichlorohydrin rubber material as a base rubber component, 0.1–5 parts by weight of a vulcanizing agent formed of a 2,3-dimercaptoquinoxaline derivative represented by the following formula (4);

(4)

wherein $R_1$, $R_2$, $R_3$ and $R_4$ represent a same one or respective different ones of a hydrogen atom and an alkyl group having 1–4 carbon atoms, 0.1–5 parts by weight of a salt of 1,8-diazabicyclo(5,4,0)undecene-7 represented by the following formula (5);

(5)

wherein X⁻ represents an acid radical of carboxylic acid or phenolic resin, and 1–20 parts by weight of at least one hydrotalcite compound represented by the following formula (6):

(6)

wherein $M_1^{2+}$ represents at least one divalent metal selected from the group consisting of Mg, Ca, Sr and Ba, $M_2^{2+}$ represents at least one divalent metal selected from the group consisting of n, Cd, Pb and Sn, $M^{3+}$ represents a trivalent metal, $A^{n-}$ represents an n-valent anion, a and b respectively represent a real number from 0 to 10, x represents a+b and a real number from 1 to 10, y represents an integer from 1 to 5, and w represents a real number.

The present hose constructed as described above assures a high sealing effect or fluid tightness with respect to a pipe or a nipple to which the hose is connected since the second layer formed of the epichlorohydrin rubber which is obtained by using the present vulcanization system exhibits excellent characteristics in terms of compression set and tension set.

The above optional object may also be attained according to a third aspect of the present invention which provides a fuel hose consisting of at least a first layer formed of a fluoro rubber or a fluoro resin, and a second layer which is laminated in contact with the first layer and which is formed of an epichlorohydrin rubber, the first layer being disposed radially inwardly of said second layer and serving as an innermost layer which contacts a fuel flowing through said hose, wherein the improvement comprises: the second layer being formed of a rubber composition which contains 100 parts by weight of an epichlorohydrin rubber material as a base rubber component, 0.1–5 parts by weight of a vulcanizing agent formed of a 2,3-dimercaptoquinoxaline derivative represented by the following formula (7);

(7)

wherein $R_1$, $R_2$, $R_3$ and $R_4$ represent a same one or respective different ones of a hydrogen atom and an alkyl group having 1–4 carbon atoms; 0.1–5 parts by weight of a salt of 1,8-diazabicyclo(5,4,0)undecene-7 represented by the following formula (8);

(8)

wherein $X^-$ represents an acid radical of carboxylic acid or phenolic resin; and 1–20 parts by weight of at least one hydrotalcite compound represented by the following formula (9);

$$[(M_1^{2+})_a(M_2^{2+})_b]_x(M^{3+})_y(OH)_{2x+3y-2}(A^{n-})_{y/n} \cdot wH_2O \quad (9)$$

wherein $M_1^{2+}$ represents at least one divalent metal selected from the group consisting of Mg, Ca, Sr and Ba, $M_2^{2+}$ represents at least one divalent metal selected from the group consisting of Zn, Cd, Pb and Sn, M represents a trivalent metal, An represents an n-valent anion, a and b respectively represent a real number from 0 to 10, x represents a+b and a real number from 1 to 10, y represents an integer from 1 to 5, and w represents a real number.

In the fuel hose as described above, the second layer of the epichlorohydrin rubber is formed of the rubber composition which employs the vulcanization system according to the present invention, whereby the second layer exhibits improved sour gasoline resistance. Accordingly, the present fuel hose effectively serves as a fuel transporting line owing to its excellent fuel impermeability exhibited by the second layer as described above and the first layer which functions as the innermost layer of the hose and which is formed of the fluoro rubber or fluoro resin.

In one preferred form of the above first, second and third aspects of the present invention, the rubber composition further contains at least one of a metal oxide and a metal hydroxide in an amount of 0.1–3 parts by weight per 100 parts by weight of the epichlorohydrin rubber material.

Owing to the addition of the metal oxide or metal hydroxide to the rubber composition, the epichlorohydrin rubber exhibits improved heat resistance.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF THE PREFERRED EMBODIMENTS

The laminar structure, hose or fuel hose according to the present invention consists at least of a first layer which is formed of a fluoro rubber or a fluoro resin, and a second layer which is laminated in contact with the first layer and formed of an epichlorohydrin rubber. In addition to these two layers, a plurality of layers (e.g., a third and a fourth layer) which are formed of suitable rubber or resin materials may be disposed on one side (inner or outer side) or both sides (inner and outer sides) of the laminar structure consisting of the first and second layers.

Figure 1:
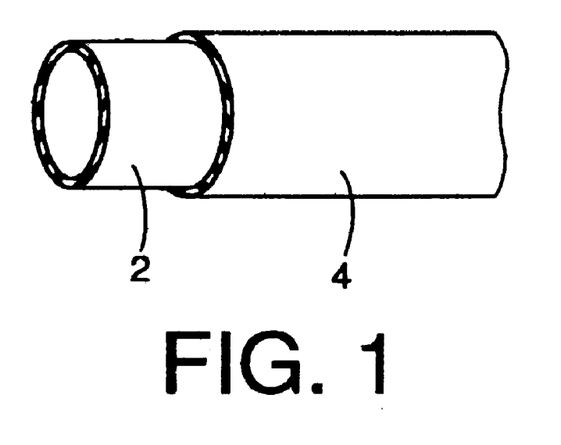
FIG. 1 is a perspective view of a fuel hose according to one embodiment of the present invention.
Figure 2:
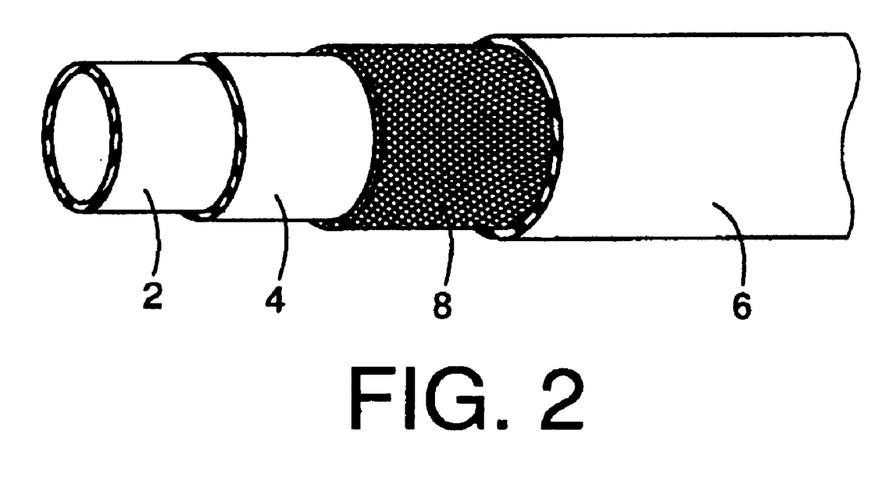
FIG. 2 is a perspective view of a fuel hose according to another embodiment of the present invention.

Referring to FIGS. 1 and 2, there are shown examples of a fuel hose constructed according to the present invention. The fuel hoses of FIGS. 1 and 2 include an innermost layer 2 which is formed of the fluoro rubber or fluoro resin and function as the first layer, and an outer layer 4 which is disposed radially outwardly of the innermost layer 2 and formed of the epichlorohydrin rubber. This outer layer 4 functions as the second layer. The fuel hose of FIG. 2 further includes an outer tube layer 6 which is formed of the epichlorohydrin rubber and disposed radially outwardly of the outer layer 4, and a known reinforcing fiber layer 8 interposed between the outer layer 4 and outer tube layer 6.

The fluoro rubber or fluoro resin which gives the first layer of the laminar structure, hose or fuel transporting hose is not particularly limited, but may be suitably selected from among known fluoro rubbers or fluoro resins. Examples of the fluoro rubber (fluoroelastomer) are: a copolymer of vinylidene fluoride and hexafluoropropylene, a terpolymer of vinylidene fluoride, hexafluoropropylene and tetrafluoroethylene, a copolymer of vinylidene fluoride and chlorotrifluoroethylene, a terpolymer of vinylidene fluoride, perfluoro methylether and tetrafluoroethylene, a copolymer of tetrafluoroethylene and propylene, a terpolymer of vinylidene fluoride, tetrafluoroethylene and propylene, and a blend of poly(vinylidene fluoride) and acrylic rubber. Examples of the fluoro resin (fluorocarbon resin) are: a terpolymer of vinylidene fluoride, hexafluoropropylene and tetrafluoroethylene, a copolymer of ethylene and tetrafluoroethylene, a copolymer of hexafluoropropylene and tetrafluoroethylene, poly(vinylidene fluoride), and polytetrafluoroethylene. In particular, the terpolymer of vinylidene fluoride, hexafluoropropylene and tetrafluoroethylene is preferably used.

The epichlorohydrin rubber material as the base rubber material which gives the second layer (4) laminated on the first layer (2) is a homopolymer of epichlorohydrin or a copolymer of epichlorohydrin with other epoxide such as ethylene oxide, propylene oxide or allyl glycidyl ether. Examples of the epichlorohydrin copolymer are: a copolymer of epichlorohydrin and ethylene oxide, a copolymer of epichlorohydrin and propylene oxide, a terpolymer of epichlorohydrin, ethylene oxide and allyl glycidyl ether, a terpolymer of epichlorohydrin, propylene oxide and allyl glycidyl ether, and a four-component copolymer of epichlorohydrin, ethylene oxide, propylene oxide and allyl glycidyl ether.

The present vulcanization system of the above-described epichlorohydrin rubber material employs a combination of a 2,3-dimercaptoquinoxaline derivative, a salt of 1,8-diazabicyclo(5,4,0)undecene-7, and at least one hydrotalcite compound. The 2,3-dimercaptoquinoxaline derivative as the vulcanizing-agent is represented by the following formula (1):

(1)

(wherein $R_1$, $R_2$, $R_3$ and $R_4$ represent a same one or respective different ones of a hydrogen atom and an alkyl group having 1–4 carbon atoms.) Specific examples of the 2,3-dimercaptoquinoxaline derivative are: quinoxaline-2,3-dithiocarbonate, 6-methylquinoxaline-2,3-dithiocarbonate, 6-isopropylquinoxaline-2,3-dithiocarbonate, and 5,8-dimethylquinoxaline-2,3-dithiocarbonate. It is particularly preferable to use 6-methylquinoxaline-2,3-dithiocarbonate. The 2,3-dimercaptoquinoxaline derivative is used in an amount of 0.1–5 parts by weight, preferably in an amount of 0.5–2 parts by weight, per 100 parts by weight of the above-described epichlorohydrin rubber material as the base rubber material. If the amount of the 2,3-dimercaptoquinoxaline derivative is lower than 0.1 parts by weight, the vulcanization of the epichlorohydrin rubber material tends to be insufficient. On the other hand, the amount of the 2,3-dimercaptoquinoxaline derivative exceeding 5 parts by weight causes scorching of the epichlorohydrin rubber material.

The salt of 1,8-diazabicyclo(5,4,0)undecene-7 (DBU) used in the present invention is generally represented by the following formula (2):

(2)

(wherein $X^-$ represents an acid radical of carboxylic acid or phenolic resin.) Specific examples of the salt of 1,8-diazabicyclo(5,4,0)undecene-7 are a DBU salt of carboxylic acid such as naphthoic acid, 2-hydroxy naphthoic acid, sorbic acid, 2-ethylhexylic acid, gallic acid, p-hydroxy benzoic acid or cinnamic acid. In the present invention, it is particularly preferable to employ the DBU salt of naphthoic acid or phenolic resin. The amount of the DBU salt used in the present invention is 0.1–5 parts by weight per 100 parts by weight of the epichlorohydrin rubber material. If the amount of the DBU salt is smaller than the lower limit, the vulcanization of the epichlorohydrin rubber material tends to be insufficient. On the other hand, the amount of the DBU salt larger than the upper limit undesirably causes scorching of the epichlorohydrin rubber material.

The at least one hydrotalcite compound in the present vulcanization system is generally represented by the following formula (3):

$$[(M_1^{2+})_a(M_2^{2+})_b]_x(M^{3+})_y(OH)_{2x+3y-2}(A^{n-})_{y/n} \cdot wH_2O \quad (3)$$

(wherein $M_1^{2+}$ represents at least one divalent metal selected from the group consisting of Mg, Ca, Sr and Ba, $M_2^{2+}$ represents at least one divalent metal selected from the group consisting of Zn, Cd, Pb and Sn, $M^{3+}$ represents a trivalent metal such as $Al^{3+}$, $Fe^{3+}$, $Cr^{3+}$, $Co^{3+}$ or $In^{3+}$, $A^{n-}$ represents an n-valent anion such as, $F^-$, $Cl^-$, $Br^-$, $NO_3^-$, $CO_3^{2-}$, $SO_4^{2-}$, $Fe(CN)_6^{4-}$, $CH_3COO^-$, oxalic acid ion or salicylic acid ion, a and b respectively represent a real number from 0 to 10, x represents a+b and a real member from 1 to 10, y represents an integer from 1 to 5, and w represents a real number.)

Examples of the hydrotalcite compound are: $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot wH_2O$ and $Mg_3ZnAl_2(OH)_{12}CO_3$. Any one of, or any combination of these hydrotalcite compounds may be used in the present invention. The hydrotalcite compound is used in an amount of 1–20 parts by weight, per 100 parts by weight of the epichlorohydrin rubber material. If the amount of the hydrotalcite compound is smaller than the lower limit, the vulcanization of the epichlorohydrin rubber material tends to be insufficient. On the other hand, the amount of the hydrotalcite compound exceeding the upper limit undesirably leads to reduction of elongation of the epichlorohydrin rubber upon fracture.

The present rubber composition which contains the epichlorohydrin rubber as the base rubber component and the vulcanization system as described above may further contain conventionally known additives as needed such as an antioxidant, a filler, a reinforcing agent, a plasticizer, a processing aid, a pigment, and a flame retardant. It is particularly preferable that the present rubber composition contain at least one of a metal oxide and a metal hydroxide in an amount of 0.1–3 parts by weight, preferably in an amount of 0.3–1.5 parts by weight, per 100 parts by weight of the epichlorohydrin rubber material. Owing to the addition of the metal oxide or metal hydroxide to the rubber composition, the vulcanized epichlorohydrin rubber exhibits a high degree of heat resistance, and excellent characteristics in terms of compression set and tension set. If the total amount of the metal oxide and/or metal hydroxide exceeds 3 parts by weight, the epichlorohydrin rubber undesirably suffers from reduction of the sour gasoline resistance, adhesive strength and storage stability. Accordingly, it is not desirable to add an excessive amount of the metal oxide or metal hydroxide. As the metal oxide or metal hydroxide, it is preferable to use an oxide or a hydroxide of an alkaline earth metal such as magnesium, calcium, etc.

In a manufacturing process of the hose such as a fuel hose, an unvulcanized rubber composition is formed into an unvulcanized hose structure by extrusion. The obtained unvulcanized hose structure is subjected to steam vulcanization with the outer surface of the hose assembly being covered by lead or resin. When the hoses as shown in FIGS. 1 and 2 wherein an outermost layer substantially consisting of the epichlorohydrin rubber is manufactured by the vulcanization method as described just above, the rubber composition which gives the outermost layer contains stearic acid for easy handling of the rubber, and for preventing adhesion of the lead or resin to the outer surface of the hose, so as to assure easy removal of the lead which covers the outer surface of the vulcanized hose. The amount of the stearic acid included in the rubber composition for the outermost layer of the hose is preferably not larger than 0.5 parts by weight per 100 parts by weight of the epichlorohydrin rubber material as the base rubber component since an excessive amount of the stearic acid undesirably lowers the adhesive strength of the second layer with respect to the first layer.

The present rubber composition which contains the epichlorohydrin rubber material as the base rubber component may further contain, as needed, any known vulcanization accelerator or retarder for the purpose of adjusting the vulcanizing speed of the rubber composition.

The laminar structure, hose or fuel hose according to the present invention is obtained by a known lamination or extrusion method. Namely, the first layer (2) of a suitable fluoro rubber or fluoro resin is first formed. On the thus formed first layer, the second layer (4) of the epichlorohydrin rubber is laminated by using the rubber composition as described above. The thus obtained article as the laminar structure or the hose is vulcanized by a known vulcanizing method. Additional layers may be formed before, during, or after the formation of the first and second layers. Thus, an intended laminar structure or hose is obtained.

EXAMPLES

To further clarify the concept of the present invention, some examples of the invention will be described. It is to be understood that the invention is not limited to the details of the illustrated examples, but may be embodied with various changes, modifications and improvements, which may occur to those skilled in the art without departing from the scope of the invention as defined in the attached claims.

Initially, there were prepared various rubber compositions Nos. 1–12 according to the present invention by uniformly kneading the compounds as indicated in the following TABLES 1–3. Similarly, there were prepared various rubber compositions as Comparative examples 1–9 by uniformly kneading the compounds as indicated in the following TABLES 4 and 5. In each of the TABLES 1–5, ECO represents a copolymer of epichlorohydrin and ethylene oxide as an epichlorohydrin rubber material ("Epichlomer C" available from Daiso Co., Ltd., Japan), GECO represents a terpolymer of epichlorohydrin, ethylene oxide and allyl glycidyl ether ("Epichlomer CG-104" available from Daiso Co., Ltd., Japan), DBU represents 1,8-diazabicyclo(5,4,0) undecene-7, and Hydrotalcite DHT-4A and Hydrotalcite DHT-4A.2 represent $Mg_{4.5}Al_2(OH)_{13}CO_3 \cdot 3.5H_2O$ and $Mg_{4.5}Al_2(OH)_{13}CO_3$, respectively. Alcamizer 4 and Alcamizer 4.2 represent $Mg_3ZnAl_2(OH)_{12}CO_3 \cdot wH_2O$ (wherein w represents a real number) and $Mg_3ZnAl_2(OH)_{12}CO_3$, respectively.

TABLE 1

| compounds | amounts (parts by weight) Present invention | | | |
|---|---|---|---|---|
| | 1 | 2 | 3 | 4 |
| ECO | 100 | — | 100 | 100 |
| GECO | — | 100 | — | — |
| SRF carbon | 70 | 70 | 70 | 70 |
| dioctyl phthalate (plasticizer) | 5 | 5 | 5 | 5 |
| nickel dibutyldithiocarbamate (antioxidant) | 1 | 1 | 1 | 1 |
| fatty acid ester (processing aid) | 3 | 3 | 3 | 3 |
| DBU salt of naphthoic acid | 1 | 1 | — | 1 |
| DBU salt of phenolic resin | — | — | 1 | — |
| Hydrotalcite DHT-4A | 5 | 5 | 5 | 1 |
| 6-methylquinoxaline-2,3-dithiocarbonate (vulcanizing agent) | 1.5 | 1.5 | 1.5 | 1.5 |
| N-cyclohexylthiophthalimide (retarder) | 1 | 1 | 1 | 1 |

TABLE 2

| compounds | amounts (parts by weight) Present invention | | | |
|---|---|---|---|---|
| | 5 | 6 | 7 | 8 |
| ECO | 100 | 100 | 100 | 100 |
| SRF carbon | 70 | 70 | 70 | 70 |
| dioctyl phthalate (plasticizer) | 5 | 5 | 5 | 5 |
| nickel dibutyldithiocarbamate (antioxidant) | 1 | 1 | 1 | 1 |
| fatty acid ester (processing aid) | 3 | 3 | 3 | 3 |
| DBU salt of | 1 | 1 | 1 | 1 |

TABLE 2-continued

| compounds | amounts (parts by weight) Present invention | | | |
|---|---|---|---|---|
| | 5 | 6 | 7 | 8 |
| naphthoic acid | | | | |
| Hydrotalcite DHT-4A | 20 | 5 | 5 | 5 |
| magnesium oxide #150 | — | 0.5 | — | — |
| magnesium hydroxide | — | — | 0.5 | — |
| calcium hydroxide | — | — | — | 0.5 |
| 6-methylquinoxaline-2,3-dithiocarbonate (vulcanizing agent) | 1.5 | 1.5 | 1.5 | 1.5 |
| N-cyclohexylthiophthalimide (retarder) | 1 | 1 | 1 | 1 |

TABLE 3

| compounds | amounts (parts by weight) Present invention | | | |
|---|---|---|---|---|
| | 9 | 10 | 11 | 12 |
| ECO | 100 | 100 | 100 | 100 |
| SRF carbon | 70 | 70 | 70 | 70 |
| dioctyl phthalate (plasticizer) | 5 | 5 | 5 | 5 |
| nickel dibutyldithiocarbamate (antioxidant) | 1 | 1 | 1 | 1 |
| fatty acid ester (processing aid) | 3 | 3 | 3 | 3 |
| DBU salt of naphthoic acid | 1 | 1 | 1 | 1 |
| Alcamizer 4 · 2 | — | 5 | — | — |
| Hydrotalcite DHT-4A | 5 | — | — | — |
| Alcamizer 4 | — | — | 5 | — |
| Hydrotalcite DHT-4A · 2 | — | — | — | 5 |
| magnesium oxide #150 | 2 | 0.5 | 0.5 | 0.5 |
| 6-methylquinoxaline-2,3-dithiocarbonate (vulcanizing agent) | 1.5 | 1.5 | 1.5 | 1.5 |
| N-cyclohexylthiophthalimide (retarder) | 1 | 1 | 1 | 1 |

TABLE 4

| compounds | amounts (parts by weight) Comparative example | | | | |
|---|---|---|---|---|---|
| | 1 | 2 | 3 | 4 | 5 |
| ECO | 100 | 100 | 100 | 100 | 100 |
| SRF carbon | 70 | 70 | 70 | 70 | 70 |
| dioctyl phthalate (plasticizer) | 5 | 5 | 5 | 5 | 5 |
| nickel dibutyldithiocarbamate (antioxidant) | 1 | 1 | 1 | 1 | 1 |
| fatty acid ester (processing aid) | 3 | 3 | 3 | 3 | 3 |
| DBU salt of naphthoic acid | 1 | 1 | 1 | — | 7 |
| Hydrotalcite DHT-4A | — | 5 | 5 | 5 | 5 |
| magnesium oxide #150 | 1.5 | — | — | — | — |
| 6-methylquinoxaline-2,3-dithiocarbamate (vulcanizing agent) | — | — | 7 | 1.5 | 1.5 |
| N-cyclohexylthiophthalimide (retarder) | — | 1 | 1 | 1 | 1 |
| 2-mercaptoimidazoline (vulcanizing agent) | 0.6 | — | — | — | — |
| morpholine disulfide (vulcanizing agent) | 0.3 | — | — | — | — |

TABLE 4-continued

| compounds | amounts (parts by weight) Comparative example | | | | |
|---|---|---|---|---|---|
| | 1 | 2 | 3 | 4 | 5 |
| 2,2-dibenzoamide diphenyl sulfide (peptizer) | 0.3 | — | — | — | — |
| minium | 1 | — | — | — | — |

TABLE 5

| compounds | amounts (parts by weight) Comparative examples | | | |
|---|---|---|---|---|
| | 6 | 7 | 8 | 9 |
| ECO | 100 | 100 | 100 | 100 |
| stearic acid | — | — | 2 | — |
| SRF carbon | 70 | 70 | 70 | 70 |
| dioctyl phthalate (plasticizer) | 5 | 5 | 5 | 5 |
| nickel dibutyldithiocarbamate (antioxidant) | 1 | 1 | 1 | 1 |
| fatty acid ester (processing aid) | 3 | 3 | 3 | 3 |
| DBU salt of naphthoic acid | 1 | 1 | 1 | 1 |
| Hydrotalcite DHT-4A | — | 30 | 5 | 5 |
| magnesium oxide #150 | — | — | — | 4 |
| 6-methylquinoxaline-2,3-dithiocarbonate (vulcanizing agent) | 1.5 | 1.5 | 1.5 | 1.5 |
| N-cyclohexylthiophthalimide (retarder) | 1 | 1 | 1 | 1 |

Each of the obtained unvulcanized rubber compositions and test pieces obtained by vulcanization thereof was evaluated in terms of: pre-vulcanization properties (which influence the scorching characteristic upon vulcanization); post-vulcanization properties (under normal or ordinary conditions); compression set; tension set; heat resistance and sour-gasoline resistance, according to the methods described below. The results of the evaluation are indicated in the following TABLES 6–10.

Pre-Vulcanization Properties (which influence the scorching characteristic)

The various compositions prepared as described above were evaluated for their storage stability according to JIS-K-6300 (JIS; Japanese Industrial Standard). Namely, for each of the rubber compositions, there were measured Mooney viscosity:ML 121° C.(1+3) and Scorching time (St. 5p) (1) immediately after the preparation of the compositions, (2) at the end of 72-hour dry-heating at 40° C. after the preparation, and (3) at the end of 24-hour wet-heating at 50° C., 95% RH after the preparation, respectively.

[2] Post-Vulcanization Properties (under normal or ordinary conditions)

Each of the rubber compositions was subjected to press curing at 160° C. for 45 minutes, to thereby provide the corresponding test piece of vulcanized rubber. The obtained test piece was measured of its initial properties according to JIS-K-6301. In the following TABLES 6–10, "TB", "EB" and "Hs" represent tensile strength (MPa), elongation (%) and JIS-A hardness, respectively.

[3] Compression Set

Compression set was measured of each of the test pieces of vulcanized rubber obtained by the press curing at 160° C. for 45 minutes (referred to as "primary vulcanization") as described above, according to JIS-K-6301 under conditions of 100° C.×72 hours and 120° C.×72 hours. The test pieces obtained from the rubber compositions Nos. 1–5 according to the comparative examples were further subjected to vulcanization at 150° C. for two hours (referred to as "secondary vulcanization"). The compression set was measured in each of the test pieces after the secondary vulcanization under the conditions as described above.

[4] Tension Set

Dumbbell specimens JIS No. 1 were produced by using the test pieces of vulcanized rubber obtained as described above from the respective rubber compositions prepared as described above. On each of the dumbbell specimens, two parallel bench marks were drawn with a distance of 40 mm therebetween. Then, the dumbbell specimen was elongated by 50%, and aged at 135° C. for 72 hours. The dumbbell specimen was then kept at room temperature for 30 minutes. The percent value of the tension set of each specimen was measured according to the following equation:

$$\text{tension set } (\%) = (L_1 - 40) \times 100 / 40$$

wherein, $L_1$: distance (mm) between the bench marks after aging

[5] Heat Resistance

Each of the test pieces of vulcanized rubber was subjected to a heat treatment at 120° C. for 168 hours. After the heat treatment, tensile strength TB (MPa), elongation EB (%) and JIS-A hardness Hs were measured for each of the test pieces according to JIS-K-6301. In the following TABLES 6–10, $\Delta$TB represents a percent value of an amount of change of the tensile strength measured after the heat treatment with respect to that measured before the heat treatment. Similarly, $\Delta$EB represents a percent value of an amount of change of the elongation and $\Delta$Hs represents a percent value of an amount of change of the hardness.

[6] Sour Gasoline Resistance

The sour gasoline resistance was evaluated according to JIS-K-6301. Described in detail, the rubber compositions were formed into respective sheets. The obtained rubber sheets were vulcanized at 160° C. for 45 minutes. For measuring changes in tensile strength, elongation and hardness of the vulcanized rubber sheets, there were prepared dumbbell specimens JIS No. 3 by punching the respective vulcanized rubber sheets. The thus obtained dumbbell specimens were immersed in FUEL-B [isooctane/toluene=70/30 (volume %)] to which 3% by weight of lauroyl peroxide was added, and kept at 40° C. for 72 hours. The amount of the FUEL-B was 150 ml for three dumbbell specimens. For measuring an amount of change in volume of the vulcanized rubber sheets, each of the rubber sheets was formed into test specimens each having a width of 20 mm, length of 50 mm and thickness of 2.00±0.15 mm. The test specimens were immersed in the above-described FUEL-B. The amount of the FUEL B was 100 ml for three test specimens.

For each of the dumbbell specimens and test specimens which had been immersed as described above, there were measured tensile strength, elongation, hardness and volume. In the following TABLES 6–10, $\Delta$TB represents an amount of change of the tensile strength measured after immersion with respect to that measured before the immersion, $\Delta$EB represents an amount of change of the elongation measured after immersion with respect to that measured before the immersion, $\Delta$Hs represents an amount of change of the hardness after immersion, and $\Delta$V represents an amount of change of the volume after immersion. The appearance of each specimen was also evaluated. The results of the evaluation are also indicated in the following TABLES 6–10.

TABLE 6

| Test items | | | Present invention | | | |
|---|---|---|---|---|---|---|
| | | | 1 | 2 | 3 | 4 |
| Pre-vulcani-zation proper-ties | immediately after preparation | ML121° C. (1 + 3) | 54 | 58 | 53 | 56 |
| | | St. 5p (minutes) | 30< | 30< | 30< | 24 |
| | after dry-heating | ML121° C. (1 + 3) | 59 | 62 | 62 | 62 |
| | | St. 5p (minutes) | 30< | 30< | 24 | 19 |
| | after wet heating | ML121° C. (1 + 3) | 61 | 65 | 64 | 63 |
| | 4 | St. 5p (minutes) | 19 | 18 | 14 | 11 |
| Post-vulcanization properties | | TB (MPa) | 12.2 | 12.4 | 12.2 | 11.9 |
| | | EB (%) | 350 | 340 | 360 | 390 |
| | | HS (JIS-A) | 69 | 69 | 69 | 67 |
| Compression set | | 100° C. × 72 hrs | 18 | 19 | 18 | 29 |
| | | 120° C. × 72 hrs | 33 | 33 | 33 | 45 |
| tension set | | | 20 | 20 | 20.5 | 25 |
| Heat resistance | | $\Delta$TB | +13 | +15 | +10 | +5 |
| | | $\Delta$EB | −47 | −49 | −49 | −60 |
| | | $\Delta$Hs | +10 | +11 | +11 | +14 |
| Sour gasoline resistance | | $\Delta$TB | −32 | −38 | −32 | −30 |
| | | $\Delta$EB | −24 | −36 | −26 | −31 |
| | | $\Delta$Hs | −9 | −6 | −10 | −12 |
| | | $\Delta$V | +14.9 | +15.0 | +15.2 | +17.2 |
| | | appearance | *a | *a | *a | *b |

*a: No abnormality was found.
*b: The test piece was softened slightly.

TABLE 7

| Test items | | | Present invention | | | |
|---|---|---|---|---|---|---|
| | | | 5 | 6 | 7 | 8 |
| Pre-vulcani-zation proper-ties | immediately after preparation | ML121° C. (1 + 3) | 64 | 54 | 52 | 54 |
| | | St. 5p (minutes) | 16 | 30< | 22 | 21 |
| | after dry-heating | ML121° C. (1 + 3) | 68 | 64 | 66 | 68 |
| | | St. 5p (minutes) | 11 | 20 | 15 | 14 |
| | after wet-heating | ML121° C. (1 + 3) | 67 | 64 | 64 | 69 |
| | | St. 5p (minutes) | 8 | 14 | 11 | 10 |
| Post-vulcanization properties | | TB (MPa) | 13 | 11.9 | 11.8 | 12.2 |
| | | EB (%) | 270 | 340 | 330 | 340 |
| | | Hs (JIS-A) | 72 | 70 | 70 | 71 |
| Compression set | | 100° C. × 72 hrs | 27 | 11 | 12 | 13 |
| | | 120° C. × 72 hrs | 43 | 27 | 27 | 29 |
| tension set | | | 24 | 18 | 17.5 | 17.5 |
| Heat resistance | | $\Delta$TB | +3 | +3 | +5 | +1 |
| | | $\Delta$EB | −45 | −28 | −30 | −31 |
| | | $\Delta$Hs | +10 | +7 | +8 | +8 |

TABLE 7-continued

| | | Present invention | | | |
|---|---|---|---|---|---|
| Test items | | 5 | 6 | 7 | 8 |
| Sour gasoline resistance | ΔTB | −28 | −34 | −34 | −36 |
| | ΔEB | −23 | −26 | −27 | −24 |
| | ΔHs | −8 | −11 | −13 | −12 |
| | ΔV | +13.2 | +11.6 | +13.0 | +13.4 |
| | appearance | *a | *a | *a | *a |

*a: No abnormality was found.

TABLE 8

| | | | Present invention | | | |
|---|---|---|---|---|---|---|
| Test items | | | 9 | 10 | 11 | 12 |
| Pre-vulcani­zation proper­ties | immediately after preparation | ML121° C. (1 + 3) | 55 | 55 | 55 | 56 |
| | | St. 5p (minutes) | 19 | 30< | 30< | 30< |
| | after dry-heating | ML121° C. (1 + 3) | 68 | 66 | 67 | 65 |
| | | St. 5p (minutes) | 12 | 18 | 17 | 18 |
| | after wet-heating | ML121° C. (1 + 3) | 68 | 66 | 69 | 67 |
| | | St. 5p (minutes) | 8 | 11 | 10 | 12 |
| Post-vulcanization properties | TB (MPa) | | 11.7 | 11.6 | 11.8 | 11.4 |
| | EB (%) | | 330 | 360 | 340 | 360 |
| | Hs (JIS-A) | | 71 | 68 | 70 | 69 |
| Compression set | 100° C. × 72 hrs | | 10 | 16 | 13 | 16 |
| | 120° C. × 72 hrs | | 24 | 34 | 28 | 34 |
| tension set | | | 17.5 | 18 | 18 | 18 |

TABLE 8-continued

| | | Present invention | | | |
|---|---|---|---|---|---|
| Test items | | 9 | 10 | 11 | 12 |
| Heat resistance | ΔTB | +12 | +2 | +4 | +4 |
| | ΔEB | −21 | −32 | −30 | −32 |
| | ΔHs | +6 | +8 | +7 | +8 |
| Sour gasoline resistance | ΔTB | −34 | −36 | −36 | −34 |
| | ΔEB | −24 | −28 | −28 | −28 |
| | ΔHs | −13 | −13 | −13 | −13 |
| | ΔV | +13.2 | +13.8 | +12.4 | +13.2 |
| | appearance | *a | *a | *a | *a |

*a: No abnormality was found.

TABLE 9

| | | | Comparative examples | | | | |
|---|---|---|---|---|---|---|---|
| Test items | | | 1 | 2 | 3 | 4 | 5 |
| Pre-vulcanization properties | immediately after preparation | ML121° C. (1 + 3) | 60 | 62 | 66 | 65 | 68 |
| | | St. 5p (minutes) | 15 | *d | 2 | *d | 2 |
| | after dry-heating | ML121° C. (1 + 3) | 68 | 65 | 100< | 67 | 100< |
| | | St. 5p (minutes) | 11 | *d | *f | *d | *f |
| | after wet-heating | ML121° C. (1 + 3) | 69 | 65 | 100< | 67 | 100< |
| | | St. 5p (minutes) | 10 | *d | *f | *d | *f |
| Post-vulcanization properties | TB (MPa) | | 12 | *e | 13.1 | *e | 13.3 |
| | EB (%) | | 360 | | 100 | | 90 |
| | Hs (JIS-A) | | 66 | | 79 | | 81 |
| Compression set | Primary vulcanization | 100° C. × 72 hrs | 59 | — | 34 | — | 38 |
| | | 120° C. × 72 hrs | 86 | — | 60 | — | 62 |
| | Secondary vulcanization | 100° C. × 72 hrs | 40 | — | — | — | — |
| | | 120° C. × 72 hrs | 63 | — | — | — | — |
| tension set | | | 39 | — | *g | — | *g |
| Heat resistance | ΔTB | | +2 | — | −16 | — | −20 |
| | ΔEB | | −46 | — | −40 | — | −38 |
| | ΔHs | | +12 | — | +11 | — | +12 |
| Sour gasoline resistance | ΔTB | | −52 | — | −45 | — | −51 |
| | ΔEB | | −40 | — | −20 | — | −40 |
| | ΔHs | | −24 | — | −18 | — | −17 |
| | ΔV | | +35.4 | — | −14.1 | — | −12.1 |
| | appearance | | *c | — | *a | — | *a |

*a: No abnormality was found.
*c: The test piece was softened.
*d: The rubber composition had no scorching.
*e: The rubber composition was not vulcanized.
*f: The measurement was impossible.
*g: The measurement was impossible because the test piece was broken during elongation.

TABLE 10

| | | | Comparative examples | | | |
|---|---|---|---|---|---|---|
| Test items | | | 6 | 7 | 8 | 9 |
| Pre-vulcani­zation proper­ties | immediately after preparation | ML121° C. (1 + 3) | 56 | 71 | 51 | 57 |
| | | St. 5p (minutes) | 30< | 13 | 30< | 13 |
| | after dry-heating | ML121° C. (1 + 3) | 68 | 79 | 59 | 80 |
| | | St. 5p (minutes) | 18 | 9 | 30< | 8 |
| | after wet-heating | ML121° C. (1 + 3) | 78 | 82 | 60 | 82 |
| | | St. 5p (minutes) | 7 | 7 | 19 | 6 |
| Post-vulcanization properties | TB (MPa) | | 11.6 | 12.2 | 12.7 | 12.4 |
| | EB (%) | | 600 | 270 | 360 | 320 |
| | Hs (JIS-A) | | 63 | 74 | 68 | 70 |
| Compression set | 100° C. × 72 hrs | | 47 | 38 | 18 | 11 |
| | 120° C. × 72 hrs | | 72 | 59 | 32 | 24 |
| tension set | | | 52 | 40 | 40 | 37 |

TABLE 10-continued

| Test items | | Comparative examples | | | |
|---|---|---|---|---|---|
| | | 6 | 7 | 8 | 9 |
| Heat resistance | ΔTB | −25 | +10 | +5 | +10 |
| | ΔEB | −58 | −52 | −46 | −26 |
| | ΔHs | +16 | +8 | +10 | +7 |
| Sour gasoline resistance | ΔTB | *h | −28 | −38 | −32 |
| | ΔEB | | −30 | −32 | −22 |
| | ΔHs | | −11 | −16 | −9 |
| | ΔV | | +10.8 | +15.8 | +14.5 |
| | appearance | *c | *a | *a | *b | a: No abnormality was found.
b: The test piece was softened slightly.
c: The test piece was softened.
h: The measurement was impossible due to softening of the test piece.

As is apparent from the results as shown in the above TABLES 6–10, the rubber compositions Nos. 1–12 according to the present invention exhibited excellent storage stability, and excellent post-vulcanization properties in terms of compression set, tension set, heat resistance and sour gasoline resistance, as well as excellent post-vulcanization properties under normal or ordinary conditions (without any load). In particular, the vulcanized rubber obtained from the rubber compositions Nos. 6–12 of the present invention wherein a predetermined amount of magnesium oxide, magnesium hydroxide or calcium hydroxide was included exhibited excellent characteristics in view of the compression set, tension set or heat resistance.

The rubber compositions as indicated in the above TABLES 1–5 were evaluated of their adhesiveness or adhesive strength with respect to a fluoro rubber (FKM) or a fluoro resin (FCP) in the following manner. The results of evaluation are indicated in the following TABLES 11–15. As the fluoro rubber, FKM (1) and (2) having the respective compositions as indicated below were used. As the fluoro resin, a terpolymer of tetrafluoroethylene-hexafluoropropylene-vinylidene fluoride ("THV 500G" available from 3M, U.S.A.) was used.

— —FKM (1)— —
copolymer of vinylidene fluoride and hexafluoropropylene ("Viton E430" available from E. I. Du Pont de Nemours & Co. Inc., U.S.A.)    100 parts by weight
SRF carbon    13 parts by weight
MgO    3 parts by weight
Ca(OH)$_2$    6 parts by weight
— —FKM (2)— —
terpolymer of vinylidene fluoride, hexafluoropropylene and tetrafluoroethylene ("Daiel G555" available from Daikin Co., Ltd., Japan)    100 parts by weight
SRF carbon    13 parts by weight
MgO    3 parts by weight
Ca(OH)$_2$    6 parts by weight The adhesiveness of the epichlorohydrin rubber obtained from each of the rubber compositions with respect to the FKM(1), FKM (2) or FCP prepared as described above was evaluated in terms of the following two items [A] and [B] (which will be described in detail) under normal or ordinary conditions, after heat aging at 120° C. for 72 hours and after immersion in FUEL-D [toluene/isooctane=60/40 (volume %)] at 40° C. for 48 hours.

[A] Peel Strength

There were prepared vulcanized sheets in the following manner. Initially, there were prepared unvulcanized epichlorohydrin rubber plates each having a thickness of 2.2 mm by using the respective rubber compositions Nos. 1–12 according to the present invention and Nos. 1–9 according to the comparative examples. Then, the FKM (or FCP) plate having a thickness of 1.2 mm and each of the unvulcanized epichlorohydrin rubber plates were superposed on each other. The thus obtained plates were subjected to press curing at 160° C. for 45 minutes at a surface pressure of 20 kgf/cm$^2$ with the plates being sandwiched by and between 3 mm-thick metal molds. The thus obtained vulcanized sheet was cut into a strip having a width of 1 inch. The strip was used as a test piece. The peel strength (kgf/inch) was measured when the FKM (or FCP) plate and the vulcanized epichlorohydrin rubber plate of the test piece were peeled off from each other at a peeling speed of 50 mm/minute by using a Strograph available from Kabushiki Kaisha Toyo Seiki Seisakusho, Japan.

[B] Condition of the Peeled Surfaces

The peeled surfaces of the test piece were visually inspected. In the following TABLES 9–12, "RF" means that the test piece of the vulcanized sheet had a fracture in the epichlorohydrin rubber plate, so that the rubber plate exposed to the peeled surfaces. "IP" means that the test piece of the vulcanized sheet was peeled at the interface between the FKM (or FCP) plate and the epichlorohydrin rubber plate. "RF/IP" means that the test piece was partially fractured in the epichlorohydrin rubber plate and partially peeled at the interface between the FKM (or FCM) plate and the epichlorohydrin rubber plate.

TABLE 11

| FKM or FCP | | Peeling characteristics | Present invention | | | |
|---|---|---|---|---|---|---|
| | | | 1 | 2 | 3 | 4 |
| FKM (1) | under normal or ordinary conditions | peel strength (kgf/inch) | 12.1 | 11.6 | 12.8 | 6.8 |
| | | condition of peeled surfaces | RF | RF | RF | RF/IP |
| | after heat aging | peel strength (kgf/inch) | 11.4 | 8.2 | 12.2 | 7.6 |
| | | condition of peeled surfaces | RF | RF | RF | RF/IP |
| | after immersion in gasoline | peel strength (kgf/inch) | 6.6 | 4.4 | 5.8 | 2.2 |
| | | condition of peeled surfaces | RF | RF | RF | RF/IP |
| FKM (2) | under normal or ordinary conditions | peel strength (kgf/inch) | 11.8 | 10.8 | 11.2 | 7.8 |
| | | condition of peeled surfaces | RF | RF | RF | RF/IP |
| | after heat aging | peel strength (kgf/inch) | 10.8 | 10.6 | 11.2 | 6.4 |
| | | condition of peeled surfaces | RF | RF | RF | RF/IP |
| | after immersion in gasoline | peel strength (kgf/inch) | 4.8 | 3.8 | 4.2 | 2.8 |
| | | condition of peeled surfaces | RF | RF | RF | RF/IP |

TABLE 11-continued

| FKM or FCP | Peeling characteristics | | Present invention | | | |
|---|---|---|---|---|---|---|
| | | | 1 | 2 | 3 | 4 |
| FCP | under normal or ordinary conditions | peel strength (kgf/inch) | 12.2 | 11.4 | 10.2 | 7.0 |
| | | condition of peeled surfaces | RF | RF | RF | RF/IP |
| | after heat aging | peel strength (kgf/inch) | 8.8 | 10.0 | 9.6 | 6.0 |
| | | condition of peeled surfaces | RF | RF | RF | RF/IP |
| | after immersion in gasoline | peel strength (kgf/inch) | 4.4 | 3.8 | 3.8 | 2.6 |
| | | condition of peeled surfaces | RF | RF | RF | RF/IP |

TABLE 12

| FKM or FCP | Peeling characteristics | | Present invention | | | |
|---|---|---|---|---|---|---|
| | | | 5 | 6 | 7 | 8 |
| FKM (1) | under normal or ordinary conditions | peel strength (kgf/inch) | 10.2 | 11.6 | 11.8 | 11.2 |
| | | condition of peeled surfaces | RF | RF | RF | RF |
| | after heat aging | peel strength (kgf/inch) | 8.8 | 10.4 | 8.2 | 8.8 |
| | | condition of peeled surfaces | RF | RF | RF | RF |
| | after immersion in gasoline | peel strength (kgf/inch) | 4.4 | 5.2 | 4.8 | 5.2 |
| | | condition of peeled surfaces | RF | RF | RF | RF |
| FKM (2) | under normal or ordinary conditions | peel strength (kgf/inch) | 12.2 | 10.2 | 11.2 | 10.0 |
| | | condition of peeled surfaces | RF | RF | RF | RF |
| | after heat aging | peel strength (kgf/inch) | 7.2 | 10.4 | 12.2 | 11.8 |
| | | condition of peeled surfaces | RF/IP | RF | RF | RF |
| | after immersion in gasoline | peel strength (kgf/inch) | 2.8 | 4.8 | 4.2 | 4.0 |
| | | condition of peeled surfaces | RF | RF | RF | RF |
| FCP | under normal or ordinary condition | peel strength (kgf/inch) | 7.8 | 11.4 | 10.6 | 10.2 |
| | | condition of peeled surfaces | RF/IP | RF | RF | RF |
| | after heat aging | peel strength (kgf/inch) | 6.4 | 8.6 | 8.2 | 8.2 |
| | | condition of peeled surfaces | RF/IP | RF | RF | RF |
| | after immersion in gasoline | peel strength (kgf/inch) | 2.4 | 4.2 | 4.4 | 4.0 |
| | | condition of peeled surfaces | RF/IP | RF | RF | RF |

TABLE 13

| FKM or FCP | Peeling characteristics | | Present invention | | | |
|---|---|---|---|---|---|---|
| | | | 9 | 10 | 11 | 12 |
| FKM (1) | under normal or ordinary conditions | peel strength (kgf/inch) | 11.4 | 10.8 | 11.2 | 11.4 |
| | | condition of peeled surfaces | RF | RF | RF | RF |
| | after heat aging | peel strength (kgf/inch) | 7.6 | 8.6 | 9.4 | 7.6 |
| | | condition of peeled surfaces | RF/IP | RF | RF | RF/IP |
| | after immersion in gasoline | peel strength (kgf/inch) | 4.6 | 4.8 | 4.4 | 4.6 |
| | | condition of peeled surfaces | RF | RF | RF | RF |
| FKM (2) | under normal or ordinary conditions | peel strength (kgf/inch) | 10.2 | 10.4 | 10.2 | 10.2 |
| | | condition of peeled surfaces | RF | RF | RF | RF |
| | after heat aging | peel strength (kgf/inch) | 6.8 | 10.2 | 10.4 | 6.8 |
| | | condition of peeled surfaces | RF/IP | RF | RF | RF |
| | after immersion in gasoline | peel strength (kgf/inch) | 3.8 | 4.2 | 4.0 | 3.8 |
| | | condition of peeled surfaces | RF | RF | RF | RF |
| FCP | under normal or ordinary conditions | peel strength (kgf/inch) | 11.2 | 10.4 | 10.6 | 11.2 |
| | | condition of peeled surfaces | RF | RF | RF | RF |
| | after heat aging | peel strength (kgf/inch) | 6.2 | 8.4 | 8.2 | 6.2 |
| | | condition of peeled surfaces | RF/IP | RF | RF | RF/IP |
| | after imemrsion in gasoline | peel strength (kgf/inch) | 3.6 | 4.2 | 4.0 | 3.6 |
| | | condition of peeled surfaces | RF | RF | RF | RF |

TABLE 14

| FKM or FCP | peeling characteristics | | Comparative examples | | | | |
|---|---|---|---|---|---|---|---|
| | | | 1 | 2 | 3 | 4 | 5 |
| FKM (1) | under normal or ordinary conditions | peel strength (kgf/inch) | 8.9 | not vul- canized | 4.4 | not vul- canized | 7.2 |
| | | condition of peeled surfaces | RF | | RF/IP | | RF/IP |
| | after heat aging | peel strength (kgf/inch) | 3.8 | | 1.8 | | 3.6 |
| | | condition of peeled surfaces | IP | | IP | | IP |
| | after immersion in gasoline | peel strength (kgf/inch) | 2.2 | | 1.6 | | 2.4 |
| | | condition of peeled surfaces | RF/IP | | IP | | RF/IP |

TABLE 15

| FKM or FCP | Peeling characteristics | | Comparative examples | | | |
|---|---|---|---|---|---|---|
| | | | 6 | 7 | 8 | 9 |
| FKM (1) | under normal or ordinary conditions | peel strength (kgf/inch) | 3.2 | 10.2 | 2.2 | 5.2 |
| | | condition of peeled surfaces | IP | RF | IP | RF/IP |
| | after heat aging | peel strength (kgf/inch) | 2.8 | 3.2 | 2.8 | 3.2 |
| | | condition of peeled surfaces | IP | IP | IP | IP |
| | after immersion in gasoline | peel strength (kgf/inch) | 0.8 | 3.8 | 0 | 0.8 |
| | | condition of peeled surfaces | IP | RF | IP | IP |

It will be understood from the results as indicated in the above TABLES 11–15 that the test pieces formed of the respective rubber compositions Nos. 1–12 according to the present invention exhibited a sufficiently high adhesive strength between the epichlorohydrin rubber plate and the FKM (1), (2) or FCP plate, whereas the peel strength and the adhesive strength were relatively small in the test pieces formed of the rubber compositions Nos. 1–9 according to the Comparative examples.

As is apparent from the above description, the present invention employs the new vulcanization system of the epichlorohydrin rubber material, which vulcanization system uses the combination of the 2,3-dimercaptoquinoxaline derivative, salt of 1,8-diazabicyclo(5,4,0)undecene-7 and hydrotalcite compound. This arrangement significantly improves the adhesiveness of the epichlorohydrin rubber with respect to the fluoro rubber or fluoro resin without using the lead compound in the vulcanization system, to thereby effectively provide an integral laminar structure, a hose having such a laminar structure and a fuel hose suitably used as a fuel transporting line. Such a fuel hose according to the present invention exhibits significantly enhanced physical properties in terms of the compression set, tension set and sour gasoline resistance.

What is claimed is:

1. A laminar structure exhibiting improved interlayer bonding strength having a first layer formed of a fluoro rubber or a fluoro resin, and a second layer formed of an epichlorohydrin rubber, which is laminated in contact with said first layer wherein the improvement comprises:

said second layer being formed of a rubber composition which contains 100 parts by weight of an epichlorohydrin rubber material as a base rubber component, 0.1–5 parts by weight of a vulcanizing agent formed of a 2,3-dimercaptoquinoxaline derivative represented by the following formula (1);

wherein $R_1$, $R_2$, $R_3$, and $R_4$ represent a same one or respective difference ones of a hydrogen atom and an alkyl group having 1–4 carbon atoms, 0.1–5 parts by weight of a salt of 1,8-diazabicyclo(5,4,0)undecene-7 represented by the following formula (2);

wherein $x^-$ represents an acid radical of carboxylic acid or phenolic resin, and 1–20 parts by weight of at least one hydrotalcite compound represented by the following formula (3);

$$[(M_1^{2+})_a(M_2^{2+})_b]_x(M^{3+})_y(OH)_{2x+3y-2}(A^{n-})_{y/n} \cdot wH_2O \qquad (3)$$

wherein $M_1^{2+}$ represents at least one divalent metal selected from the group consisting of Mg, Ca, Sr and Ba, $M_2^{2+}$ represents at least one divalent metal selected from the group consisting of Zn, Cd, Pb and Sn, $M^{3+}$ represents a trivalent metal, $A^{N-}$ represents an n-valent anion, a+b respectively represent a real number from 0 to 10, x represents a+b and a real number from 1 to 10, y represents an integer from 1 to 5, and wherein w represents a real number from 0 to 4.

2. A laminar structure according to claim 1, wherein said rubber composition further comprises a metal oxide in an amount of 0.1–3 parts by weight per 100 parts by weight of said epichlorohydrin rubber material.

3. A laminar structure according to claim 1, wherein said rubber composition further comprises a metal oxide in an amount of 0.3–1.5 parts by weight per 100 parts by weight of said epichlorohydrin rubber material.

4. A laminar structure according to claim 2, wherein said metal oxide is an oxide of an alkaline earth metal.

5. A laminar structure according to claim 23, wherein said metal hydroxide is a hydroxide of an alkaline earth metal.

6. A laminar structure according to claim 1, wherein said rubber composition contains said vulcanizing agent formed of said 2,3-dimercaptoguinoxaline derivative in an amount of 0.5–2 parts by weight per 100 parts by weight of said epichlorohydrin rubber material.

7. A laminar structure according to claim 1, wherein said 2,3-dimercaptoquinoxaline derivative is selected from the group consisting of quinoxaline-2,3-dithiocarbonate, 6-methylquinoxaline-2,3-dithiocarbonate, 6-isopropylquinoxaline-2,3-dithiocarbonate, and 5,8-dimethylquinoxaline-2,3-dithiocarbonate.

8. A laminar structure according to claim 1, wherein said fluoro rubber is selected from the group consisting of: a copolymer of vinylidene fluoride and hexafluoropropylene, a terpolymer of vinylidene fluoride, hexafluoropropylene and tetrafluoroethylene, a copolymer of vinylidene fluoride and chlorotrifluoroethylene, a terpolymer of vinylidene fluoride, perfluoro methylether and tetrafluoroethylene, a copolymer of tetrafluoroethylene and propylene, a terpolymer of vinylidene fluoride, tetrafluoroethylene and propylene, and a blend of poly(vinylidene fluoride) and acrylic rubber.

9. A laminar structure according to claim 1, wherein said fluoro resin is selected from the group consisting of: a terpolymer of vinylidene fluoride, hexafluoropropylene and tetrafluoroethylene, a copolymer of ethylene and tetrafluoroethylene, a copolymer of hexafluoropropylene and tetrafluoroethylene, poly(vinylidene fluoride), and polytetrafluoroethylene.

10. A laminar structure according to claim 1, wherein said epichlorohydrin rubber material is selected from the group consisting of: a homopolymer of epichlorohydrin, a copolymer of epichlorohydrin and ethylene oxide, a copolymer of epichlorohydrin and propylene oxide, a terpolymer of epichlorohydrin, ethylene oxide and allyl glycidyl ether, and a four-component copolymer of epichlorohydrin, ethylene oxide, propylene oxide and allyl glycidyl ether.

11. A hose having a laminar structure exhibiting improved interlayer bonding strength having a first layer formed of a fluoro rubber or a fluoro resin, and a second layer formed of an epichlorohydrin rubber which is laminated in contact with said first layer, wherein the improvement comprises:

said second layer being formed of a rubber composition which contains 100 parts by weight of an epichlorohydrin rubber material as a base rubber component, 0.1–5 parts by weight of a vulcanizing agent formed of a 2,3-dimercaptoquinoxaline derivative represented by the following formula (4);

(4)

wherein $R_1$, $R_2$, $R_3$, and $R_4$ represent a same one or respective different ones of a hydrogen atom and an alkyl group having 1–4 carbon atoms, 0.1–5 parts by weight of a salt of 1,8-diazabicyclo(5,4,0)undecene-7 represented by the following formula (5);

(5)

wherein $x^-$ represents an acid radical of carboxylic acid or phenolic resin, and 1–20 parts by weight of at least one hydrotalcite compound represented by the following formulas (6);

(6)

wherein $M_1^{2+}$ represents at least one divalent metal selected from the group consisting of Mg, Ca, Sr and Ba, $M_2^{2+}$ represents at least one divalent metal selected from the group consisting of Zn, Cd, Pb and Sn, $M^{3+}$ represents a trivalent metal, $A^{N-}$ represents an n-valent anion, a and b respectively represent a real number from 0 to 10, x represents a+b and a real number from 1 to 10, y represents an integer from 1 to 5, and w represents a real number.

12. A hose according to claim 11, wherein said rubber composition further comprises a metal oxide in an amount of 0.1–3 parts by weight per 100 parts by weight of said epichlorohydrin rubber material.

13. A hose according to claim 11, wherein said rubber composition further comprises a metal oxide in an amount of 0.3–1.5 parts my weight per 100 parts by weight of said epichlorohydrin rubber material.

14. A hose according to claim 12, wherein said metal oxide is an oxide of an alkaline earth metal.

15. A hose according to claim 25, wherein said metal hydroxide is a hydroxide of an alkaline earth metal.

16. A hose according to claim 11, wherein said rubber composition contains said vulcanizing agent formed of said 2,3-dimercaptoquinoxaline derivative in an amount of 0.5–2 parts by weight per 100 parts by weight of said epichlorohydrin rubber material.

17. A fuel hose exhibiting improved interlayer bonding strength having a first layer formed of a fluoro rubber or a fluoro resin, and a second layer which is laminated in contact with said first layer formed of an epichlorohydrin rubber, said first layer being disposed radially inwardly of said second layer and serving as an innermost layer which contacts a fuel flowing through said hose, wherein the improvement comprises:

said second layer being formed of a rubber composition which contains 100 parts by weight of an epichlorohydrin rubber material as a base rubber component, 0.1–5 parts by weight of a vulcanizing agent formed of a 2,3-dimercaptoquinoxaline derivative represented by the following formula (7);

wherein $R_1$, $R_2$, $R_3$, and $R_4$ represent a same one or respective different ones of a hydrogen atom and an alkyl group having 1–4 carbon atoms, 0.1–5 parts by weight of a salt of 1,8-diazabicyclo(5,4,0)undecene-7 represented by the following formula (8);

wherein $x^-$ represents an acid radical of carboxylic acid or phenolic resin, and 1–20 parts by weight of at least one hydrotalcite compound represented by the following formulas (9);

wherein $M_1^{2+}$ represents at least one divalent metal selected from the group consisting of Mg, Ca, Sr and Ba, $M_2^{2+}$ represents at least one divalent metal selected from the group consisting of Zn, Cd, Pb and Sn, $M^{3+}$ represents a trivalent metal, $A^{N-}$ represents an n-valent anion, a and b respectively represent a real number from 0 to 10, x represents a+b and a real number from 1 to 10, y represents an integer from 1 to 5, and w represents a real number.

18. A fuel hose according to claim 17, wherein said rubber composition further comprises a metal oxide in an amount of 0.1–3 parts by weight per 100 parts by weight of said epichlorohydrin rubber material.

19. A fuel hose according to claim 17, wherein said rubber composition further comprises a metal oxide in an amount of 0.3–1.5 parts by weight per 100 parts by weight of said epichlorohydrin rubber material.

20. A fuel hose according to claim 18, wherein said metal oxide is an oxide of an alkaline earth metal.

21. A fuel hose according to claim 27, wherein said metal hydroxide is a hydroxide of an alkaline earth metal.

22. A fuel hose according to claim 17, wherein said rubber composition contains said vulcanizing agent formed of said 2,3-dimercaptoquinoxaline derivative in an amount of 0.5–2 parts by weight per 100 parts by weight of said epichlorohydrin rubber material.

23. A laminar structure according to claim 1, wherein said rubber composition further comprises a metal hydroxide in an amount of 0.1–3 parts by weight per 100 parts by weight of said epichlorohydrin rubber material.

24. A laminar structure according to claim 1, wherein said rubber composition further comprises a metal hydroxide in an amount of 0.3–1.5 parts by weight per 100 parts by weight of said epichlorohydrin rubber material.

25. A hose according to claim 11, wherein said rubber composition further comprises a metal hydroxide in an amount of 0.1–3 parts by weight per 100 parts by weight of said epichlorohydrin rubber material.

26. A hose according to claim 11, wherein said rubber composition further comprises a metal hydroxide in an amount of 0.3–1.5 parts by weight per 100 parts by weight of said epichlorohydrin rubber material.

27. A fuel hose according to claim 17, wherein said rubber composition further comprises a metal hydroxide in an amount of 0.1–3 parts by weight per 100 parts by weight of said epichlorohydrin rubber material.

28. A fuel hose according to claim 17, wherein said rubber composition further comprises a metal hydroxide in an amount of 0.3–1.5 parts by weight per 100 parts by weight of said epichlorohydrin rubber material.

* * * * *